United States Patent
Yuan et al.

(10) Patent No.: US 12,380,018 B2
(45) Date of Patent: Aug. 5, 2025

(54) METHOD FOR HOST ACCESS TO NETWORK DEVICE-MANAGED MEMORY POOL

(71) Applicant: Huawei Technologies Co., Ltd., Shenzhen (CN)

(72) Inventors: Hui Yuan, Beijing (CN); Yinben Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/447,046

(22) Filed: Aug. 9, 2023

(65) Prior Publication Data

US 2023/0385190 A1 Nov. 30, 2023

Related U.S. Application Data

(63) Continuation of application No. PCT/CN2021/120844, filed on Sep. 27, 2021.

(30) Foreign Application Priority Data

Feb. 10, 2021 (CN) .......................... 202110184060.3
Jun. 11, 2021 (CN) .......................... 202110656360.7

(51) Int. Cl.
*G06F 12/02* (2006.01)
*G06F 13/42* (2006.01)
*G06F 15/173* (2006.01)

(52) U.S. Cl.
CPC ........ *G06F 12/023* (2013.01); *G06F 13/4282* (2013.01); *G06F 15/17331* (2013.01); *G06F 2212/251* (2013.01); *G06F 2213/0026* (2013.01)

(58) Field of Classification Search
CPC .............. G06F 12/023; G06F 13/4282; G06F 15/17331; G06F 2212/251; G06F 2213/0026
See application file for complete search history.

(56) References Cited

U.S. PATENT DOCUMENTS

| | | |
|---|---|---|
| 2010/0325268 A1 | 12/2010 | Muthiah et al. |
| 2019/0243787 A1 | 8/2019 | Mittal et al. |
| 2020/0322287 A1* | 10/2020 | Connor ................... H04L 47/32 |
| 2022/0222010 A1* | 7/2022 | Bachmutsky ......... G06F 3/0655 |
| 2022/0222118 A1* | 7/2022 | Wang ................... G06F 12/1063 |
| 2022/0237113 A1* | 7/2022 | Woo ..................... G06F 12/0882 |

* cited by examiner

*Primary Examiner* — Ryan Bertram
(74) *Attorney, Agent, or Firm* — Slater Matsil, LLP

(57) ABSTRACT

In accordance with an embodiment, a communication method includes: receiving, by a first host, a memory access address sent by a network device, wherein the memory access address points to a memory unit in a first memory pool, the network device is connected to the first host, the network device is configured to switch and forward a service of the first host, and the network device is further configured to manage the first memory pool; and in response to memory of the first host satisfying a preset condition, accessing, by the first host, the memory unit based on the memory access address.

20 Claims, 7 Drawing Sheets

METHOD FOR HOST ACCESS TO NETWORK DEVICE-MANAGED MEMORY POOL

CROSS-REFERENCE TO RELATED APPLICATIONS

This application is a continuation of International Application No. PCT/CN2021/120844, filed on Sep. 27, 2021, which claims priority to Chinese Patent Application No. 202110184060.3, filed on Feb. 10, 2021 and Chinese Patent Application No. 202110656360.7, filed on Jun. 11, 2021. All of the aforementioned patent applications are hereby incorporated by reference in their entireties.

TECHNICAL FIELD

This application relates to the field of communication, and more specifically, to a communication method, apparatus, and system.

BACKGROUND

A host (for example, a server) usually includes resources such as computing, memory, and a storage. All applications in the host need to run in the memory. However, the memory in the host is usually configured in advance. Therefore, during running of an application, memory may be insufficient, affecting running performance of the application.

When memory is insufficient in the host, the application usually obtains memory space by accessing the storage (for example, a hard disk) in the host. However, a latency (which may be at millisecond level) of accessing the storage is much greater than a latency of directly accessing the memory (100 nanoseconds). This greatly deteriorates the running performance of the application.

Therefore, how to improve running performance of an application in a host is an urgent technical problem to be resolved.

SUMMARY

This application provides a communication method, apparatus, and system, to improve running performance of an application in a host.

According to a first aspect, a communication method is provided. A first host receives a memory access address sent by a network device. The memory access address points to a memory unit in a first memory pool. The network device is connected to the first host. The network device is configured to switch and forward a service of the first host, and the network device is further configured to manage the first memory pool. When memory of the first host satisfies a preset condition, the first host accesses the memory unit based on the memory access address.

It should be understood that currently, a network device that is connected to a host and that can switch and forward a service of the host generally does not include a memory management function. In other words, in this application, the memory management function needs to be deployed in the network device in advance.

It should be understood that management performed by a network device on a first memory pool includes implementing functions such as address isolation, access control, message distribution, traffic control, and access conflict handling. These functions are exactly what the network device is good at, and therefore, a management difficulty and costs of the first memory pool can be reduced.

In the communication method provided in this application, a first host may receive a memory access address sent by a network device, where the memory access address points to a memory unit in a first memory pool, so that when memory of the first host satisfies a preset condition, the first host can access the memory unit in the first memory pool based on the memory access address, thereby expanding the memory of the first host and improving running performance of an application in the first host. In addition, because the first memory pool is managed by the network device, a management difficulty and costs of the first memory pool can be reduced.

With reference to the first aspect, in an implementation of the first aspect, the network device is further connected to at least one second host. The network device is configured to switch and forward a service of the at least one second host. The at least one second host provides a second memory pool. The first memory pool includes the second memory pool.

That the at least one second host provides a second memory pool means that the second memory pool may be a logical memory pool formed by memories of one or more second hosts.

It should be understood that because the first memory pool is managed by the network device and the first memory pool includes the second memory pool, the second memory pool is also managed by the network device in this application.

In this embodiment of this application, the first memory pool may include the second memory pool, and the second memory pool is a logical memory pool formed by memories of one or more second hosts. In this way, when the memory of the first host satisfies a preset condition, the first host can access memory of the second host based on the memory access address, so that the memory of the first host can be expanded, and running performance of an application in the first host can be improved. In addition, memory usage of the second host can be improved. Moreover, because the second memory pool of the second host is managed by the network device, a management difficulty and costs of the second memory pool can be reduced.

With reference to the first aspect, in an implementation of the first aspect, the network device includes a third memory pool, and the first memory pool includes the third memory pool.

It should be understood that currently, a network device that is connected to a host and that can switch and forward a service of the host generally does not include a memory pool. In other words, in this implementation, the memory pool needs to be deployed in the network device in advance.

In this embodiment of this application, the first memory pool may include the third memory pool, and the third memory pool is a memory pool of the network device. In this way, when the memory of the first host satisfies a preset condition, the first host can access the third memory pool of the network device based on the memory access address, so that the memory of the first host can be expanded, and running performance of an application in the first host can be improved. In addition, compared with accessing memory of a second host (that is, accessing memory of a second memory pool), an access path of the memory can be shortened, and a latency of accessing the memory can be reduced. Moreover, because the third memory pool is managed by the network device, a management difficulty and costs of the third memory pool can be reduced.

Optionally, in an actual operation, the first memory pool may include only the second memory pool, or may include only the third memory pool, or may include both the second memory pool and the third memory pool (that is, the first memory pool is a logical memory pool including the second memory pool and the third memory pool). In addition, the network device manages the first memory pool, so that the memory of the first host can be expanded, and a management difficulty and costs of the memory pool can be reduced.

With reference to the first aspect, in an implementation of the first aspect, before a first host receives a memory access address sent by a network device, the method further includes: When memory of the first host satisfies the preset condition, the first host sends a request message to the network device, where the request message is for requesting memory in the first memory pool.

With reference to the first aspect, in an implementation of the first aspect, the preset condition is any one of the following: memory usage of the first host is greater than a first threshold; remaining memory space of the first host is less than a second threshold; remaining memory space of the first host is less than memory space required for processing a service in a future target time period by the first host; or a memory usage policy of the first host is preferentially using the first memory pool.

Optionally, the first threshold or the second threshold may be a specific value, or may be a percentage.

For example, when the preset condition is that memory usage of the first host is greater than a first threshold, the first threshold may be a percentage, for example, may be 80%, 90%, or 98%. This is not limited in this application. It should be understood that when the memory usage of the first host is greater than the first threshold, it indicates that the application in the first host already occupies large memory space.

For example, when the preset condition is that remaining memory space of the first host is less than a second threshold, the second threshold may be a specific value, for example, 0 G, 5 G, or 8 G, or may be a percentage, for example, 0%, 10%, or 20%. This is not limited in this application. It should be understood that when the remaining memory space of the first host is less than the second threshold, it indicates that small remaining memory space of the first host may be used by the application.

Optionally, if the preset condition is that remaining memory space of the first host is less than memory space required for processing a service in a future target time period by the first host, the foregoing method further includes: predicting memory space required for processing a service (that is, running an application) in a future target time period by the first host.

That is, in this application, the memory space required for processing the service in the future target time period by the first host may be predicted. When the memory of the first host satisfies the preset condition (that is, the remaining space of the memory of the first host is less than the memory space required for processing the service in the future target time period) by the first host, the first memory pool is accessed in advance based on the memory access address, so that a latency problem caused by the first host requesting the memory from the network device after the memory of the first host is used up can be avoided, and running performance of an application in the first host can be further improved.

With reference to the first aspect, in an implementation of the first aspect, the first host includes a network interface card, and the first host communicates with the network device via a remote direct memory access (RDMA) protocol.

With reference to the first aspect, in an implementation of the first aspect, the first host includes a bus interface, and the first host communicates with the network device via a peripheral component interconnect express PCIe bus or a compute express link CXL.

With reference to the first aspect, in an implementation of the first aspect, when the first host no longer needs to use the memory unit, the method further includes: The first host sends a notification message to the network device, where the notification message includes the memory access address, to enable the network device to release the memory unit.

Optionally, in this application, the first memory pool may alternatively be used as a shared memory pool of a plurality of hosts.

In this embodiment of this application, when the first host no longer needs to use the memory unit in the network device, the first host may send the notification message to the network device, to enable the network device to release the memory unit for use by another host.

It should be understood that releasing the memory unit includes modifying the memory unit from a used state to an idle state.

According to a second aspect, a communication method is provided. A network device receives a request message sent by a first host. The request message is for requesting memory in a first memory pool. The network device is connected to the first host. The network device is configured to switch and forward a service of the first host, and the network device is further configured to manage the first memory pool. The network device sends a memory access address to the first host, where the memory access address points to a memory unit in the first memory pool.

It should be understood that, that the network device sends a memory access address to the first host specifically means that the network device sends the memory access address to the first host based on the request message.

With reference to the second aspect, in an implementation of the second aspect, the network device is further connected to at least one second host. The network device is configured to switch and forward a service of the at least one second host. The at least one second host provides a second memory pool. The first memory pool includes the second memory pool.

With reference to the second aspect, in an implementation of the second aspect, the network device includes a third memory pool, and the first memory pool includes the third memory pool.

With reference to the second aspect, in an implementation of the second aspect, the first host communicates with the network device via a remote direct memory access RDMA protocol.

With reference to the second aspect, in an implementation of the second aspect, the first host communicates with the network device via a peripheral component interconnect express PCIe bus or a compute express link CXL.

With reference to the second aspect, in an implementation of the second aspect, that the network device sends a memory access address to the first host includes: The network device determines, an idle memory unit in the first memory pool. The network device sends a memory access address corresponding to the idle memory unit to the first host, to enable the first host to use the idle memory unit.

With reference to the second aspect, in an implementation of the second aspect, the method further includes: The network device records a status of each memory unit in the first memory pool, where the status includes idle and used.

It should be understood that if the status is used, it indicates that memory space of the memory unit is occupied. If the status is idle, it indicates that memory space of the memory unit is unoccupied.

With reference to the second aspect, in an implementation of the second aspect, the method further includes: The network device receives a notification message sent by the first host, where the notification message includes the memory access address. The network device releases the memory unit based on the notification message.

Optionally, in this application, the first memory pool may alternatively be used as a shared memory pool of a plurality of hosts.

In this embodiment of this application, the network device may receive the notification message sent by the first host, where the notification message includes the memory access address, and then release, based on the notification message, the memory unit corresponding to the memory access address for use by another host.

It should be understood that releasing the memory unit includes modifying the memory unit from a used state to an idle state.

According to a third aspect, a communication apparatus is provided. The communication apparatus is used in a first host. The communication apparatus includes: a receiving module, configured to receive a memory access address sent by a network device, where the memory access address points to a memory unit in a first memory pool, the network device is connected to the first host, the network device is configured to switch and forward a service of the first host, and the network device is further configured to manage the first memory pool; and a processing module, configured to access the memory unit based on the memory access address when memory of the first host satisfies a preset condition.

With reference to the third aspect, in an implementation of the third aspect, the network device is further connected to at least one second host. The network device is configured to switch and forward a service of the at least one second host. The at least one second host provides a second memory pool. The first memory pool includes the second memory pool.

With reference to the third aspect, in an implementation of the third aspect, the network device includes a third memory pool, and the first memory pool includes the third memory pool.

With reference to the third aspect, in an implementation of the third aspect, the communication apparatus further includes a sending module, configured to send a request message to the network device when memory of the first host satisfies the preset condition, where the request message is for requesting memory in the first memory pool.

With reference to the third aspect, in an implementation of the third aspect, the preset condition is any one of the following: memory usage of the first host is greater than a first threshold; remaining memory space of the first host is less than a second threshold; remaining memory space of the first host is less than memory space required for processing a service in a future target time period by the first host; or a memory usage policy of the first host is preferentially using the first memory pool.

With reference to the third aspect, in an implementation of the third aspect, the first host includes a network interface card, and the first host communicates with the network device via a remote direct memory access RDMA protocol.

With reference to the third aspect, in an implementation of the third aspect, the first host includes a bus interface, and the first host communicates with the network device via a peripheral component interconnect express PCIe bus or a compute express link CXL.

With reference to the third aspect, in an implementation of the third aspect, when the first host no longer needs to use the memory unit, the sending module is further configured to send a notification message to the network device, where the notification message includes the memory access address, to enable the network device to release the memory unit.

According to a fourth aspect, a communication apparatus is provided. The communication apparatus is used in a network device. The communication apparatus includes: a receiving module, configured to receive a request message sent by a first host, where the request message is for requesting memory in a first memory pool, the network device is connected to the first host, the network device is configured to switch and forward a service of the first host, and the network device is further configured to manage the first memory pool; and a sending module, configured to send a memory access address to the first host, where the memory access address points to a memory unit in the first memory pool.

With reference to the fourth aspect, in an implementation of the fourth aspect, the network device is further connected to at least one second host. The network device is configured to switch and forward a service of the at least one second host. The at least one second host provides a second memory pool. The first memory pool includes the second memory pool.

With reference to the fourth aspect, in an implementation of the fourth aspect, the network device includes a third memory pool, and the first memory pool includes the third memory pool.

With reference to the fourth aspect, in an implementation of the fourth aspect, the first host communicates with the network device via a remote direct memory access RDMA protocol.

With reference to the fourth aspect, in an implementation of the fourth aspect, the first host communicates with the network device via a peripheral component interconnect express PCIe bus or a compute express link CXL.

With reference to the fourth aspect, in an implementation of the fourth aspect, the communication apparatus further includes a processing module, configured to determine an idle memory unit in the first memory pool. The sending module is further configured to send a memory access address corresponding to the idle memory unit to the first host, to enable the first host to use the idle memory unit.

With reference to the fourth aspect, in an implementation of the fourth aspect, the processing module is further configured to record a status of each memory unit in the first memory pool, where the status includes idle and used.

With reference to the fourth aspect, in an implementation of the fourth aspect, the receiving module is further configured to receive a notification message sent by the first host, where the notification message includes the memory access address. The processing module is further configured to release the memory unit based on the notification message.

According to a fifth aspect, a communication system is provided, including the communication apparatus according to any one of the third aspect or the possible implementations of the third aspect and the communication apparatus according to any one of the fourth aspect or the possible implementations of the fourth aspect.

According to a sixth aspect, a communication apparatus is provided, including a processor and a memory. The processor runs instructions in the memory, to enable the communication apparatus to perform the communication method according to any one of the first aspect or the possible implementations of the first aspect, and/or perform the communication method according to any one of the second aspect or the possible implementations of the second aspect.

According to a seventh aspect, a computing device is provided, including at least one processor and a memory. The at least one processor is coupled to the memory, and is configured to read and execute instructions in the memory, to perform the communication method according to any one of the first aspect or the possible implementations of the first aspect, and/or perform the communication method according to any one of the second aspect or the possible implementations of the second aspect.

According to an eighth aspect, a computer program product including instructions is provided. When the computer program product runs on a computer, the computer is enabled to perform the communication method according to any one of the first aspect or the possible implementations of the first aspect, and/or perform the communication method according to any one of the second aspect or the possible implementations of the second aspect.

According to a ninth aspect, a computer-readable storage medium is provided. The computer-readable storage medium includes instructions, where the instructions are used for implementing the communication method according to any one of the first aspect or the possible implementations of the first aspect, and/or implementing the communication method according to any one of the second aspect or the possible implementations of the second aspect.

According to a tenth aspect, a chip is provided. The chip includes a processor and a data interface. The processor reads, through the data interface, instructions stored in a memory, to perform the communication method according to any one of the first aspect or the possible implementations of the first aspect, and/or perform the communication method according to any one of the second aspect or the possible implementations of the second aspect.

Optionally, in an implementation, the chip may further include a memory. The memory stores instructions. The processor is configured to execute the instructions stored in the memory. When the instructions are executed, the processor is configured to perform the communication method according to any one of the first aspect or the possible implementations of the first aspect, and/or perform the communication method according to any one of the second aspect or the possible implementations of the second aspect.

According to an eleventh aspect, a chip system is provided. The chip system includes at least one processor, configured to support implementation of functions in the first aspect or some implementations of the first aspect, and/or implementation of functions in the second aspect or some implementations of the second aspect, for example, receiving or processing data and/or information in the foregoing method.

In a possible design, the chip system further includes a memory. The memory is configured to store program instructions and data. The memory is located inside the processor or outside the processor. The chip system may include a chip, or may include a chip and another discrete component.

For beneficial effects of the second aspect to the eleventh aspect of this application, refer to the descriptions of beneficial effects of the first aspect and the implementations of the first aspect.

DETAILED DESCRIPTION OF ILLUSTRATIVE EMBODIMENTS

In some embodiments, a communication method, apparatus, and system, applicable to a data center network DCN architecture is provided. The method may include a network device sending a memory access address to a first host, where the memory access address points to a memory unit in a first memory pool, the network device is connected to the first host, the network device is configured to switch and forward a service of the first host, and the network device is further configured to manage the first memory pool. When memory of the first host satisfies a preset condition, the first host accesses the memory unit based on the memory access address. Some embodiments may advantageously improve the running performance of an application in a host The background technology in this application will first be described in detail below.

As mentioned above, a host (for example, a server) generally includes resources such as computing, memory, and a storage. All applications in the host need to run in the memory. However, the memory in the host is generally configured in advance. Therefore, during running of an application, memory may be insufficient, affecting running performance of the application.

Figure 1:
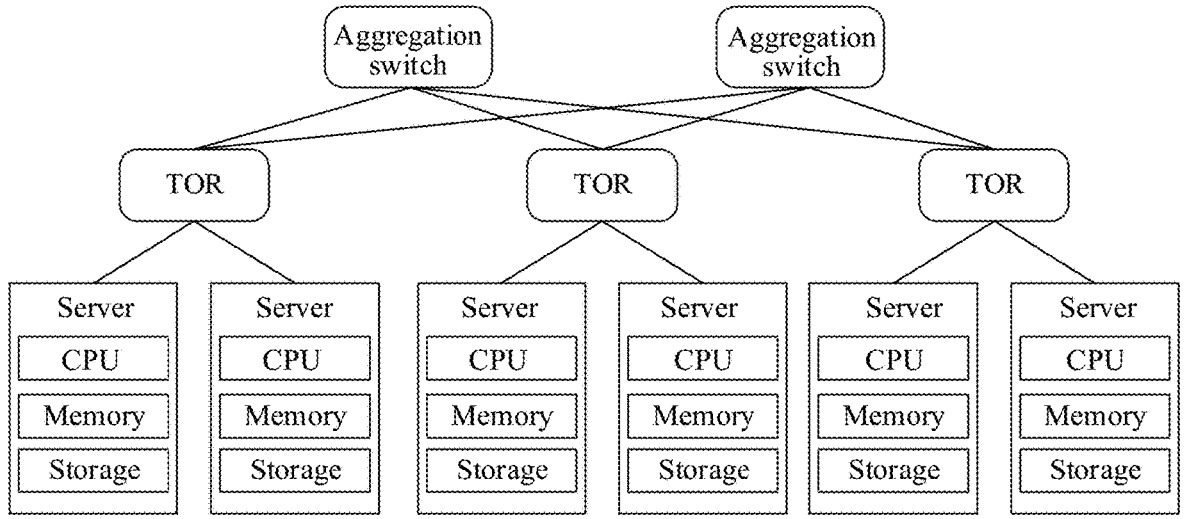
FIG. 1 is an example diagram of a conventional DCN architecture.
Figure 2:
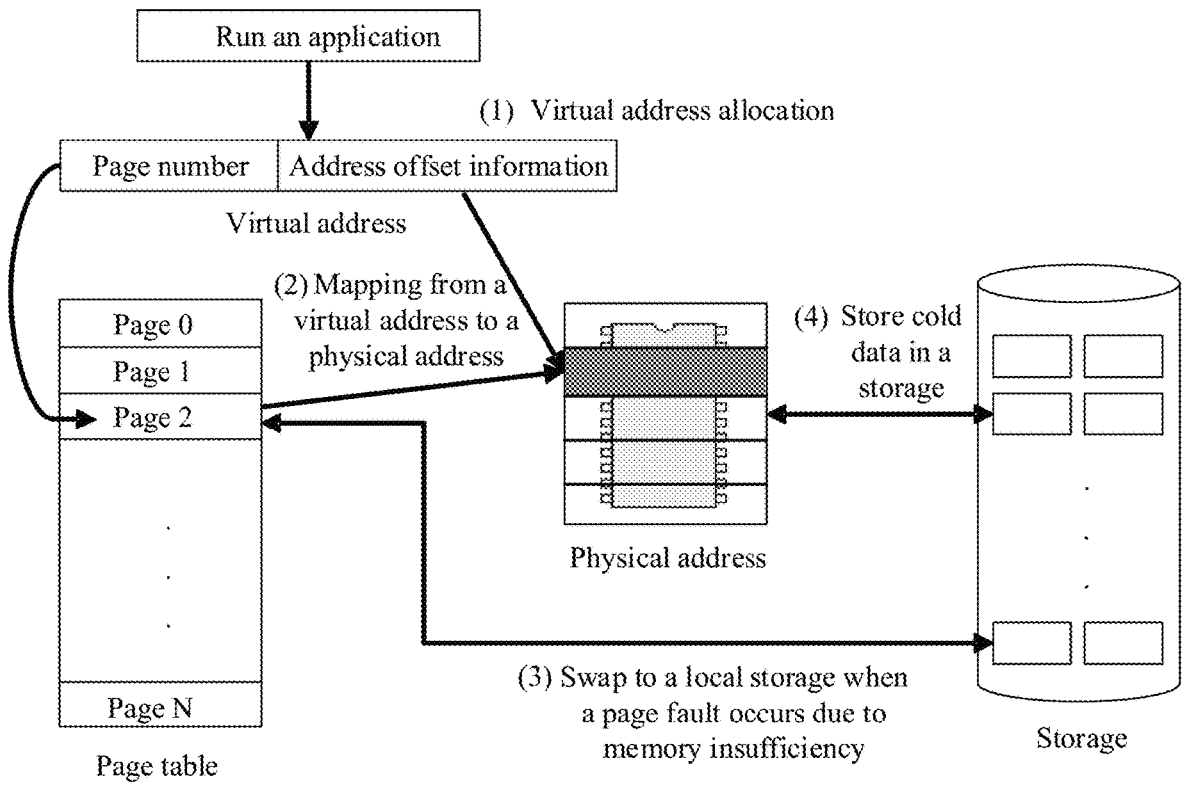
FIG. 2 is an example diagram of a memory access procedure of an application in a server according to an embodiment of this application.

When memory is insufficient in the host, the application may obtain memory space by accessing the storage (for example, a hard disk) in the host. With reference to FIG. 1 and FIG. 2, the following uses a server in a conventional data center network (DCN) architecture as an example to describe a memory access procedure when memory is insufficient in the server.

FIG. 1 is an example diagram of a conventional DCN architecture. As shown in FIG. 1, a conventional data center is mainly based on a server-centric architecture. In this architecture, each server has a fixed quantity of computing (that is, a central processing unit (CPU)), memory, and storage (for example, a solid state drive (SSD), a mechanical hard disk (HDD) etc.) resources. Servers in a same rack are not directly interconnected. Instead, they are interconnected through a corresponding top of rack (TOR) switch. A TOR switch (TOR for short) may also be referred to as an access switch or a leaf switch. TORs communicate with each other via an aggregation switch. Therefore, in this architecture, servers in different racks may communicate with each other via a TOR and an aggregation switch.

In the conventional DCN architecture, when memory of a server is used up, the server cannot access memory of another server.

Each server in a DCN can be considered as an independent data processing unit. With reference to FIG. 2, a memory access procedure of an application in a server is described below.

As shown in FIG. 2, in a conventional DCN architecture, a memory access procedure of an application in a server mainly includes the following steps.

(1) For each application, an operating system in the server allocates a virtual address, and the virtual address includes a page number and address offset information.
(2) A memory management unit (MMU) in a CPU converts the virtual address into a physical address based on address mapping information in a page table, thereby implementing access to a physical memory during application processing.
(3) If in step (2), the allocated virtual address cannot find corresponding physical address information in the page table (for example, the physical memory is insufficient), the system generates a page fault. In this case, the system obtains an address space from a storage in the server in a swap manner.
(4) In a process of using the physical memory, to optimize the access procedure, the system may implement a simple cold and hot data replacement function. Some cold data in the memory is placed in the storage, to reserve the memory for use by more applications.

It can be seen that when memory is insufficient in the server, the system obtains the address space from the storage in the server, to ensure normal running of the application. However, a latency (which may be at millisecond level) of accessing the storage is usually much greater than a latency of directly accessing the memory (100 nanoseconds). This greatly deteriorates the running performance of the application.

Based on this, this application proposes a communication method, by which when memory of a host satisfies a preset condition, the host can access memory in a memory pool managed and controlled by a network device. In this way, not only memory expansion of the host can be implemented, but also quick access of the memory can be implemented, thereby improving the running performance of the application in the host, and reducing a management difficulty and costs of the memory pool.

Solutions of this application are described in detail below with reference to the accompanying drawings.

Figure 3:
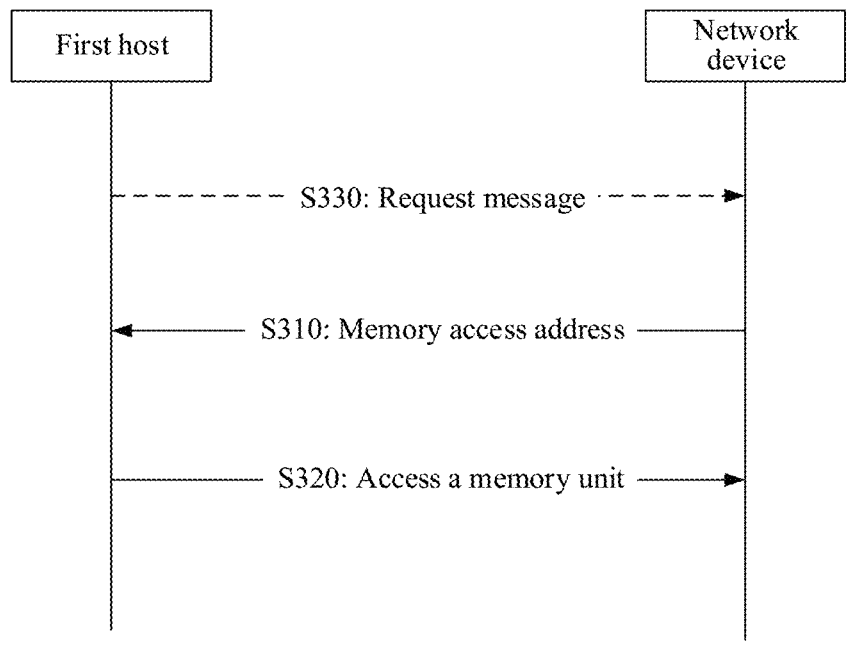
FIG. 3 is an example diagram of a communication method according to an embodiment of this application.

FIG. 3 is an example diagram of a communication method according to an embodiment of this application. As shown in FIG. 3, the method 300 may include S310 and S320. The steps in the method 300 are described in detail below.

S310: A network device sends a memory access address to a first host.

Correspondingly, the first host receives the memory access address sent by the network device. The memory access address points to a memory unit in a first memory pool, the network device is connected to the first host, the network device is configured to switch and forward a service of the first host, and the network device is further configured to manage the first memory pool.

It should be understood that a host (including the first host and a second host below) in embodiments of this application may be any computing device, for example, any one of a server, a computer, a desktop computer, a virtual machine, or another user equipment. This is not limited in this application. It should be understood that the host may communicate with a distributed storage system through a network, and an operating system and another application are installed on the host. For ease of description, in the following embodiments, functions of a host are described by using a server as an example, with reference to FIG. 5 to FIG. 7.

It should be understood that the network device in embodiments of this application is connected to the host (which may be a direct connection, or may be an indirect connection), and can switch and forward a service of the host. Optionally, the network device may be any one of an access switch, an intelligent switch, an aggregation switch, another network device form having a switching function, and the like. This is not limited in this application. For ease of description, a TOR is used as an example for description in the following embodiments.

It should be understood that in embodiments of this application, the network device and the host may perform an end-to-end data exchange, and termination of a communication protocol may be implemented on the network device (that is, processing related to the communication protocol is performed on a received data packet, instead of mere forwarding).

It should be further understood that currently, a network device that is connected to a host and that can switch and forward a service of the host generally does not include a memory management function. In other words, in this application, the memory management function needs to be deployed in the network device in advance.

It should be understood that management performed by a network device on a first memory pool includes implementing functions such as address isolation, access control, message distribution, traffic control, and access conflict handling. These functions are exactly what the network device is good at, and therefore, a management difficulty and costs of the first memory pool can be reduced.

Optionally, the first memory pool may be a T-level memory pool, or may be a G-level memory pool. This is not limited in this application. T and G are memory units.

Optionally, the network device may further record a status of each memory unit in the first memory pool, where the status includes idle and used. After a memory unit is allocated to a host, the network device may set a status of the memory unit to used. When the memory unit is unallocated, the network device may set the status of the memory unit to idle. For example, the network device may set a status flag bit for each memory unit, and different values of the status flag bit may indicate different states of the memory unit.

Optionally, that a network device sends a memory access address to a first host includes: The network device determines an idle memory unit in a first memory pool. The network device sends a memory access address corresponding to the idle memory unit to the first host, to enable the first host to use the idle memory unit.

Optionally, before the network device sends the memory access address to the first host (correspondingly, the first host receives the memory access address sent by the network device), the method 300 may further include step S330: When memory of the first host satisfies a preset condition, the first host sends a request message to the network device, where the request message is for requesting memory in the first memory pool. Correspondingly, the network device receives the request message sent by the first host. In this case, that a network device sends a memory access address to a first host actually means that the network device sends the memory access address to the first host based on the request message.

Step S330 may be replaced with the following implementation process: The network device learns memory usage in the first host through the first host or another memory monitoring device. Next, the network device sends a memory access address to the first host based on the memory usage in the first host. For example, the network device may send the memory access address to the first host when memory usage of the first host is high, or remaining memory of the first host is low, or remaining memory of the first host cannot meet later requirements. It should be understood that a condition for triggering sending of the memory access address to the first host by the network device is not limited in this application.

Optionally, the preset condition includes but is not limited to any one of the following: memory usage of the first host is greater than a first threshold; remaining memory space of the first host is less than a second threshold; remaining memory space of the first host is less than memory space required for processing a service in a future target time period by the first host; or a memory usage policy of the first host is preferentially using the first memory pool.

Optionally, the first threshold and the second threshold may be specific values, or may be percentages.

For example, when the preset condition is that memory usage of the first host is greater than a first threshold, the first threshold may be a percentage, for example, may be 80%, 90%, or 98%. This is not limited in this application. It should be understood that when the memory usage of the first host is greater than the first threshold, it indicates that running of the application in the first host already occupies large memory space.

For example, when the preset condition is that remaining memory space of the first host is less than a second threshold, the second threshold may be a specific value, for example, 0 G, 5 G, or 8 G, or may be a percentage, for example, 0%, 10%, or 20%. This is not limited in this application. It should be understood that when the remaining memory space of the first host is less than the second threshold, it indicates that small remaining memory space of the first host may be used for running of the application.

Optionally, if the preset condition is that remaining memory space of the first host is less than memory space required for processing a service in a future target time period by the first host, the method 300 may further include: predicting memory space required for processing a service (that is, running an application) in a future target time period by the first host. That is, in this application, the memory space required for processing the service in the future target time period by the first host may be predicted. When the memory of the first host satisfies the preset condition (that is, the remaining space of the memory of the first host is less than the memory space required for processing the service in the future target time period by the first host), the first host accesses the memory in the first memory pool in advance based on the memory access address, so that a latency problem caused by the first host requesting the memory from the network device after the memory of the first host is used up can be avoided, and running performance of an application in the first host can be further improved.

S320: When memory of the first host satisfies the foregoing preset condition, the first host accesses a memory unit based on a memory access address.

It should be understood that for the description of the preset condition, refer to the foregoing. Details are not described herein again.

In the communication method provided in this application, a network device may send a memory access address to a first host, where the memory access address points to a memory unit in a first memory pool, so that when memory of the first host satisfies a preset condition, the first host can access the memory unit in the first memory pool of the network device based on the memory access address, thereby expanding the memory of the first host and improving running performance of an application in the first host. In addition, because the first memory pool is managed by the network device, a management difficulty and costs of the first memory pool can be reduced.

Figure 4:
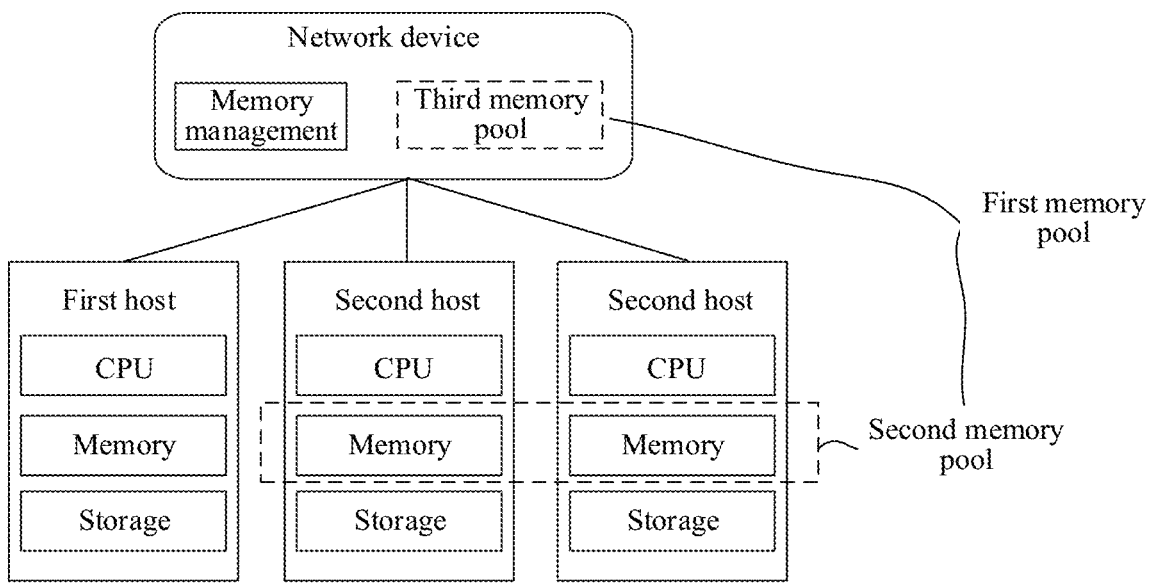
FIG. 4 is an example composition diagram of a first memory pool according to an embodiment of this application.

Composition of a first memory pool in embodiments of this application is described in detail with reference to FIG. 4. As shown in FIG. 4:

In a first optional manner, the network device may be further connected to at least one second host (two second hosts are shown in FIG. 4), and the network device is configured to switch and forward a service of the at least one second host. The at least one second host provides a second memory pool, and the first memory pool includes the second memory pool. Optionally, the first memory pool may include only the second memory pool.

That the at least one second host provides a second memory pool means that the second memory pool may be a logical memory pool formed by memories of one or more second hosts. Optionally, memory in the second memory pool dynamically changes with memory usage in each host. Therefore, when a small quantity of applications run on the first host, remaining memory in the first host may also belong to the second memory pool.

It should be understood that because the first memory pool is managed by the network device and the first memory pool includes the second memory pool, the second memory pool is also managed by the network device in this application.

It should be understood that in this application, memory in each host (including the first host and the second host) may include a plurality of memory units. That is, a logical second memory pool provided by one or more second hosts may also include a plurality of memory units. Optionally, a plurality of memory units in each host may be all formed by a dynamic random access memory (DRAM), or may be all formed by a storage-class memory (SCM) (for example, a non-volatile memory (NVM), a phase-change memory (PCM), or an Intel persistent memory (apache pass, AEP)), or may be formed by a combination of a high bandwidth memory (HBM), DRAM and an SCM. Types and composition manners of memory units in each host are not limited in this application. In addition, types and composition manners of the plurality of memory units included in the logical second memory pool provided by the one or more second hosts are not limited in this application either.

It should be understood that in this optional manner, each host connected to a network device needs to register memory with the network device in real time or at an interval, that is, to provide available memory space information of the host to the network device. The network device collects all information and maintains, manages, and allocates the information. When the first host (which may be any host connected to the network device) needs to obtain memory from a memory pool (that is, a preset condition is satisfied), the first host may request the network device. The network device allocates a memory address to the first host based on obtained memory pool information. Next, the first host directly accesses the allocated memory.

In this case, an access path of the memory is: second host memory—(second host network interface card)—network device—(first host network interface card)—first host memory first host CPU.

In this embodiment of this application, the first memory pool may include the second memory pool, and the second memory pool is a logical memory pool formed by memories of one or more second hosts. In this way, when the memory of the first host satisfies a preset condition, the first host can access memory of the second host based on the memory access address, so that the memory of the first host can be expanded, and running performance of an application in the first host can be improved. In addition, memory usage of the second host can be improved. Moreover, because the second memory pool of the second host is managed by the network device, a management difficulty and costs of the second memory pool can be reduced.

In a second optional manner, the network device may include a third memory pool. In this case, the first memory pool may include the third memory pool. Optionally, the first memory pool may include only the third memory pool.

It should be understood that currently, a network device that is connected to a host and that can switch and forward on a service of the host generally does not include a memory pool. In other words, in this implementation, the memory pool needs to be deployed in the network device in advance.

In this case, an access path of the memory is: network device memory—(first host network interface card)—first host memory—first host CPU.

It should be understood that the third memory pool provided by the network device may include a plurality of memory units. Optionally, the plurality of memory units in the third memory pool may all be formed by a DRAM, or may all formed by an SCM (for example, an NVM, a PCM, and an AEP), or may be formed by a combination of an HBM, a DRAM, and an SCM. Types and composition manners of memory units in the third memory pool are not limited in this application. It should be further understood that when formed by combination as described above, the network device further needs to perform hierarchical management on the third memory pool.

Optionally, the plurality of memory units in the third memory pool may be deployed (that is, accessed) in the network device in various manners. For example, a plurality of memory units may be accessed via a memory interface directly provided by a chip (for example, an application-specific integrated circuit (ASIC) chip) in a network device, and the chip performs memory management on the plurality of memory units. Alternatively, another new chip (including a plurality of CPU cores) may be introduced into a network device to function as a switch chip, and the chip may support memory management and an interface, where the interface is configured to access a plurality of memory units. Alternatively, a field-programmable gate array (FPGA) may be built in a network device, and the FPGA performs memory management, and provides a memory interface, where the interface is configured to access a plurality of memory units. Alternatively, the FPGA may be externally connected to a network device, and the FPGA performs memory management, and provides a memory interface, where the interface is configured to access a plurality of memory units. In conclusion, how to access the plurality of memory units is not limited in this application. It should be further understood that memory management may be implemented in the foregoing manner, or may be implemented through another newly added memory management module or processing module. This is not limited in this application.

In this embodiment of this application, the first memory pool may include the third memory pool, and the third memory pool is a memory pool of the network device. In this way, when the memory of the first host satisfies a preset condition, the first host can access the third memory pool of the network device based on the memory access address, so that the memory of the first host can be expanded, and running performance of an application in the first host can be improved. In addition, compared with accessing memory of a second host (that is, accessing memory of a second memory pool), an access path of the memory can be shortened, and a latency of accessing the memory can be reduced. Moreover, because the third memory pool is managed by the network device, a management difficulty and costs of the third memory pool can be reduced.

In a third optional manner, the first memory pool may include the second memory pool and the third memory pool (that is, the first memory pool is a logical memory pool including the second memory pool and the third memory pool), and the first memory pool is managed by the network device.

It should be understood that in this optional manner, when accessing memory in the first memory pool, the first host may first access memory in the second memory pool, that is, may first access memory of the second host, or may first access memory in the third memory pool in the network device. A memory access sequence is not limited in this application.

In addition, for ease of description, in the following embodiments (as shown in FIG. to FIG. 7), an example in which the first memory pool includes only the third memory pool in the network device is used for description.

Optionally, in this application, the first memory pool may be used as a shared memory pool of a plurality of hosts, so that when memory of any host connected to a network device satisfies a preset condition, the host may request to access memory in the first memory pool.

Optionally, when the first host no longer needs to use the memory unit, the method 300 may further include: The first host sends a notification message to the network device. The notification message includes a memory access address of the memory unit, to enable the network device to release the memory unit. Correspondingly, the network device receives the notification message sent by the first host, and the network device releases, based on the notification message, the memory unit corresponding to the memory access address. It should be understood that releasing the memory unit includes modifying the memory unit from a used state to an idle state.

In this embodiment of this application, when the first host no longer needs to use the memory unit in the network device, the first host may send the notification message to the network device, to enable the network device to release, based on the notification message, the corresponding memory unit for use by another host.

It should be understood that a high-speed communication manner may be used between the first host and the network device.

Figure 6:
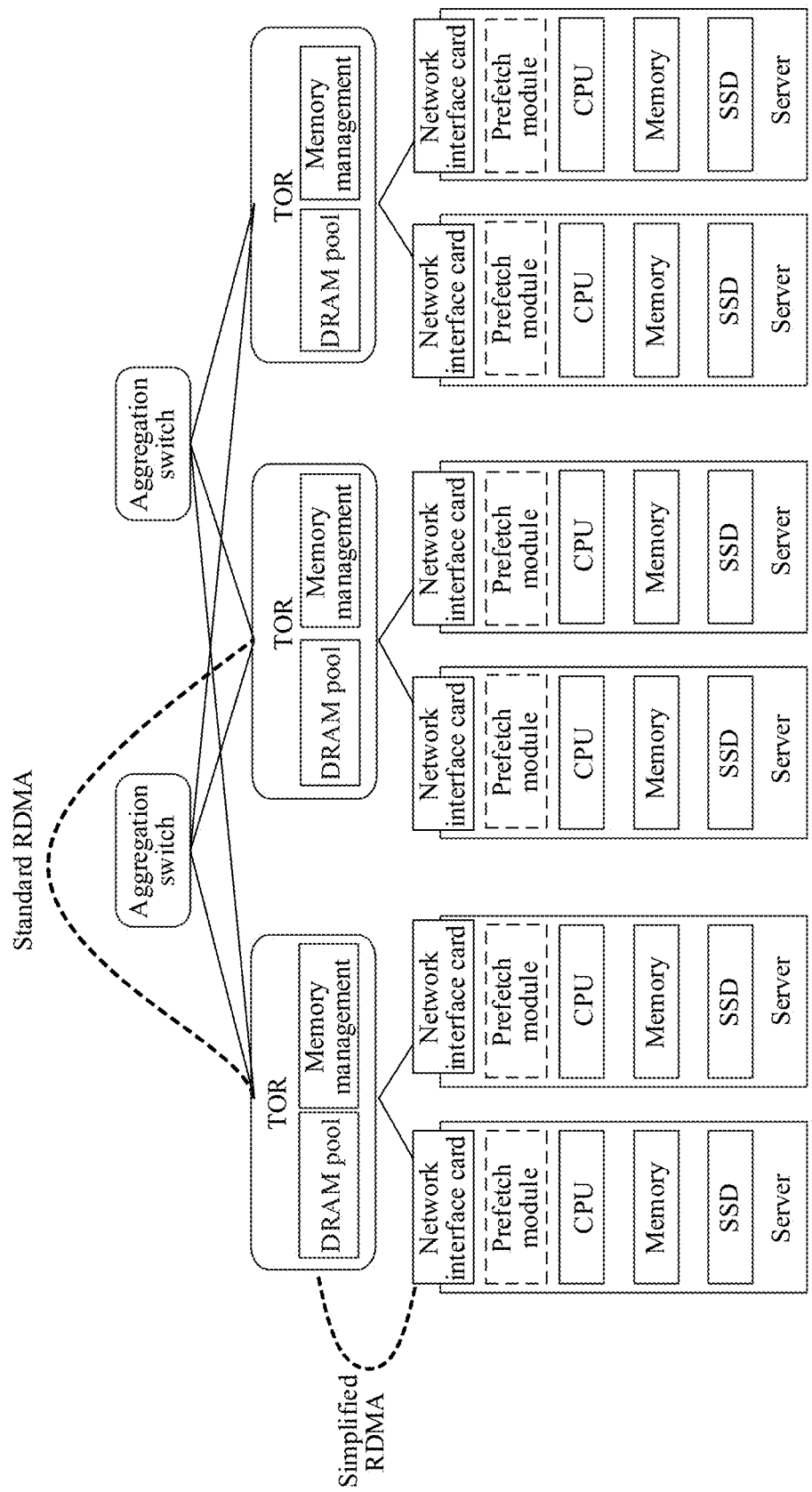
FIG. 6 is an example diagram of a TOR-based memory pooling architecture according to an embodiment of this application.

For example, the first host and the network device may communicate with each other via a remote direct memory access (RDMA) protocol and the like. Specifically, communication may be performed via a simplified RDMA protocol or a standard RDMA protocol. The simplified RDMA protocol includes a communication protocol obtained by performing function deletion or optimization on an existing RDMA protocol. This is not limited in this embodiment. It should be understood that because the standard RDMA protocol is too complex, in the following embodiments, a preferential communication manner is the simplified RDMA protocol. Refer to FIG. 6. It should be understood that when the first host communicates with the network device via the RDMA protocol, communication needs to be implemented through a network interface card on the first host and a communication module on the network device.

Figure 7:
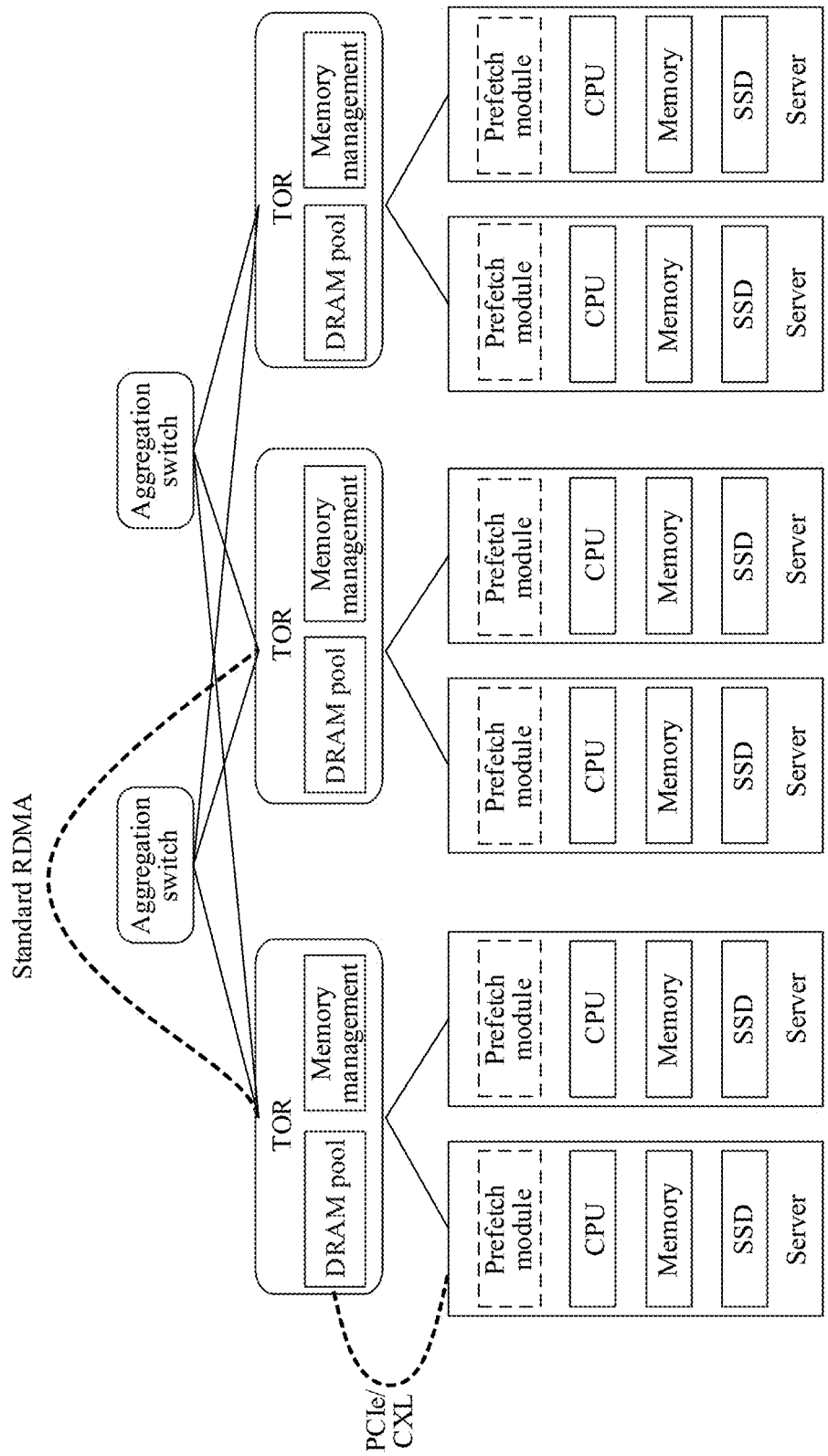
FIG. 7 is an example diagram of another TOR-based memory pooling architecture according to an embodiment of this application.

For example, the first host may alternatively communicate with the network device via a bus, such as a peripheral component interconnect express (PCIe) bus or a compute express link. Refer to FIG. 7. In this case, the memory in the first memory pool may be directly accessed in a manner of synchronized memory semantics or direct memory access (DMA), thereby improving a remote access speed. It should be understood that communication between the first host and the network device needs to be implemented through a bus interface on the first host and a communication module on the network device. It should be further understood that in this case, an engine such as a PCIe/CXL and a DMA engine need to be added to the network device.

It should be understood that an application scenario of the method 300 is not limited in this application. Optionally, in an example, the method 300 may be applied to a DCN architecture shown in FIG. 5.

Figure 5:
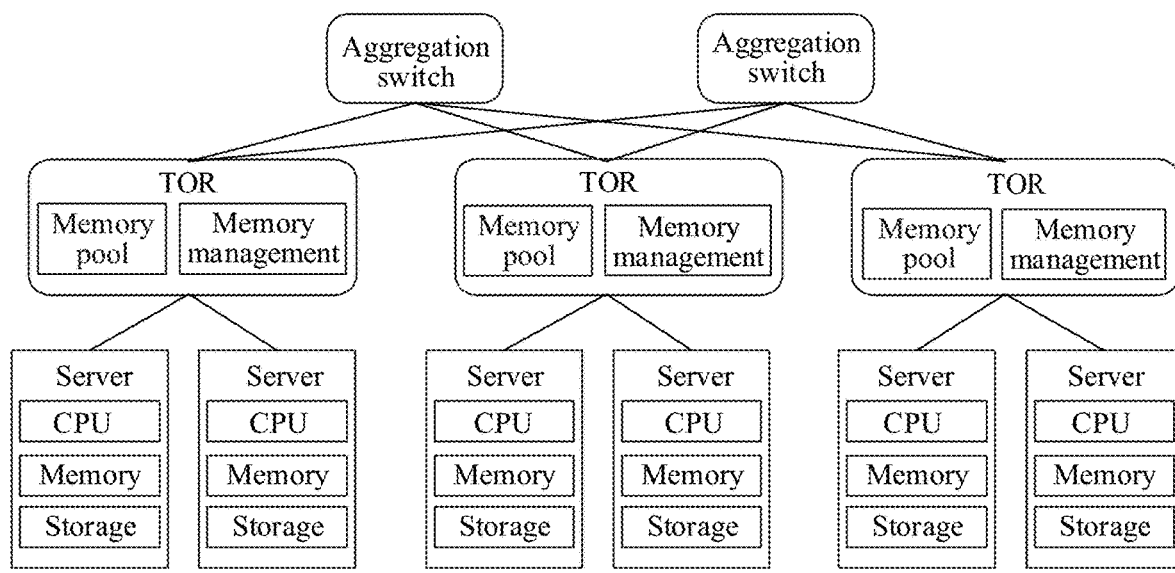
FIG. 5 is an example diagram of a DCN architecture according to an embodiment of this application.

FIG. 5 is an example diagram of a DCN architecture according to an embodiment of this application. As shown in FIG. 5, the architecture is mainly based on the conventional DCN architecture shown in FIG. 1. A memory pool (for example, the third memory pool, and in this example, an example in which the first memory pool includes only the third memory pool is used for description) is connected to a TOR switch (for example, the network device). In addition, a corresponding functional module (a memory management module) is also deployed in the TOR switch to manage memory in the memory pool. In addition, a communication module (not shown) is further deployed to implement an end-to-end data exchange between the TOR switch and a server (for example, the first host), and terminate a communication protocol on the TOR switch (that is, processing related to the communication protocol is performed on a received datagram), so that the server can access memory in the TOR switch.

Further, with reference to FIG. 6 and FIG. 7, examples of a DCN architecture and an application processing procedure based on the architecture provided in embodiments of this application are described below. In this example, an example in which a memory pool of a TOR switch is a DRAM pool and a storage is an SSD is used. It should be understood that FIG. 6 and FIG. 7 are merely examples, and do not constitute a limitation on this application.

FIG. 6 is an example diagram of a TOR-based memory pooling architecture according to an embodiment of this application. As shown in FIG. 6, a TOR includes a DRAM pool, and the TOR may further provide a memory management function. It should be understood that for an access manner of the DRAM and an implementation module of the memory management function, refer to the foregoing description.

In this example, the standard/simplified RDMA protocol stack needs to be implemented on the TOR. In this way, when memory in a server is insufficient, the server can access memory in the TOR through a high-speed network. In an actual operation, as shown in FIG. 6, a data transmission procedure may be classified into two types. One type is that when a server needs to access memory in a corresponding TOR, the server may directly implement the access via a simplified RDMA. In this case, a communication procedure is: TOR memory—server network interface card—server local memory—server local CPU. The simplified RDMA is a communication protocol obtained by performing function deletion or optimization on an existing RDMA. This is not limited in this embodiment. The other type is that TORs may communicate with each other via a standard RDMA.

In an implementation, in the architecture shown in FIG. 6, the server may not include a prefetch module.

Based on an architecture in which the server does not include the prefetch module, an application processing procedure is as follows:
(1) For each application, an operating system in the server allocates a virtual address, and the virtual address includes a page number and address offset information.
(2) An MMU in a CPU converts the virtual address into a physical address based on address mapping information in a page table, thereby implementing access to a physical memory during application processing.
(3) In step (2), the system preferentially uses local memory (for example, memory in the server). When the local memory is insufficient, the system attempts to access memory in a corresponding TOR. As an example, a specific procedure is as follows:
(a) First, during system configuration, a kernel module of the operating system in the server is connected to a memory management module on a TOR, so that the server can detect memory in the TOR.
(b) When local memory in the server satisfies a preset condition (for example, remaining memory is insufficient), the server requests the TOR to use the memory in the TOR. After receiving the request, the memory management module on the TOR allocates a portion of memory space to the server, and sends a memory access address of the allocated memory space to the server.
(c) After obtaining the memory access address, the server may access the memory in the TOR in a manner such as an RDMA (for example, a simplified RDMA shown in FIG. 6).
In this step, communication between the server and the corresponding TOR is implemented through a network interface card on the server and a communication module on the TOR.
(4) When local memory in the server and memory in the TOR are both insufficient, the system may access memory in a TOR in another rack via a standard RDMA, or may obtain address space from an SSD in a local server in a swap manner. This is not limited.

It should be understood that in a DCN architecture, applications run on each server are generally different, so that requirements of CPUs and memory corresponding to different servers in the DCN architecture are not fixed, the ratio fluctuates in a large range, and it is difficult to match a fixed resource ratio. In this case, for the conventional DCN architecture shown in FIG. 1, a server cannot access memory of another server by breaking through a boundary of the server. In this way, when CPUs in some servers are used up (for example, there are two CPU cores, and the two CPU cores are both used), remaining memory resources may be wasted. Similarly, when some memory resources are used up, remaining CPUs (for example, there are four CPU cores, and three of the CPU cores are not used) may be wasted, leading to low overall CPU and memory usage in the entire DCN cluster, and causing a waste of resources.

For the DCN architecture provided in this application, because a memory pool is provided in a TOR, on the one hand, memory of a server can be dynamically expanded, so that the server can use memory in the TOR when local memory is insufficient, an application can maintain high performance, and utilization of a cluster resource (for example, a CPU resource) can be improved. The cluster refers to a system including a server and a TOR. On the other hand, configuration requirements of memory in a server can be reduced through statistical reuse of memory in a cluster. With the same total memory capacity of the cluster (memory configured in the server is reduced by an amount, this amount of memory is deployed in a TOR, and the total memory capacity of the cluster remains unchanged), memory usage and application performance can be improved. While application performance is kept the same, the total memory capacity of the cluster can be reduced through statistical reuse of memory in the TOR, so that costs are reduced. For example, a 100 G memory is configured for each server in the architecture in FIG. 1. In the architecture in this application, a 60 G memory may be configured for each server, and an 80 G memory is configured for each TOR (it is assumed that one TOR is connected to two servers). In this way, a total memory capacity of a cluster in the architecture in this application is the same as a total memory capacity of a cluster in the conventional architecture. In the architecture of this application, memory configured in a TOR may be used as a shared memory of all servers. In this way, when a sum of memory in some servers and memory of a TOR corresponding to the servers is insufficient, memory in another TOR may be used instead, so that memory usage and application performance can be improved when a total memory capacity of a cluster remains unchanged. For another example, in the architecture in FIG. 1, a 100 G memory is configured for each server. Running of an application in some servers needs to occupy 100 G, running of an application in some servers needs to occupy 60 G, and running of an application in some servers needs to occupy 80 G. In short, the occupied memory is not fixed. In this case, in the architecture of this application, a 60 G memory may be configured for each server. Further, memory (o to 80 G, also assuming that one TOR is connected to two servers) is configured for each TOR based on memory that needs to be occupied by an application running on each server in the architecture of FIG. 1. In this way, a total memory capacity of a cluster is reduced when application performance is the same, thereby reducing costs.

In another implementation, a prefetch module may be introduced into the server, to reduce a latency generated when the memory in the TOR is accessed through a network in an actual operation. It should be understood that in this case, in addition to the prefetch module, a memory access address monitoring module (not shown in the figure) may be further added to the server. This is not limited in this embodiment. It should be understood that the prefetch module and the memory access address monitoring module may exist independently, or may exist in a kernel of an operating system in the server. This is not limited in this embodiment.

Based on an architecture in which the server includes the prefetch module, an application processing procedure is as follows:

In an application processing procedure, the memory access address monitoring module analyzes a memory access status of an application in real time, and predicts, by tracking the memory access status of the application, memory space required for running the application in a future target time period. If the system, based on obtained information, determines that a remaining local memory of the server will soon be unable to meet future requirements, the prefetch module may trigger pre-memory access between the server and a TOR, to obtain an address space required in the future in advance, thereby avoiding a page fault in the system in the future.

It should be understood that obtaining an address space required in the future in advance may be obtaining, in advance, a memory access address sent by the TOR, and transmitting processed data in the local memory to the TOR based on the memory access address in advance, to reserve the local memory for use by an application.

It should be understood that in the application processing procedure in the former implementation (the server does not include the prefetch module), a required address space is obtained from the TOR switch only when the memory is insufficient (that is, a page fault occurs). In this case, application processing stops, and the application waits for the memory space before continuing to process. However, in the latter implementation, the address space required in the future is obtained in advance in a prefetch manner, and the obtaining the address space required in the future in advance and application processing may occur simultaneously. In this way, a memory access latency and a page fault occurrence can be greatly reduced, and application performance can also be improved.

In still another implementation, the server and the TOR may communicate with each other via a bus such as a PCIe/CXL shown in FIG. 7, instead of through a simplified RDMA shown in FIG. 6. It should be understood that when communication is performed after a standard bus is used for interconnection, communication between the server and the TOR needs to be implemented through a bus interface on the server and a communication module on the TOR. In this case, a specific communication procedure is as follows: TOR memory—server local memory—server local CPU.

In this implementation, communication between the server and the TOR is implemented via the PCIe/CXL, and the memory in the TOR may be directly accessed in a manner of synchronized memory semantics or DMA, thereby improving a remote access speed. It should be understood that in this case, an engine such as a PCIe/CXL and a DMA engine further need to be added to the TOR.

To implement the methods in the foregoing embodiments of this application, this application further provides a communication apparatus 800 and a communication apparatus 900.

Figure 8:
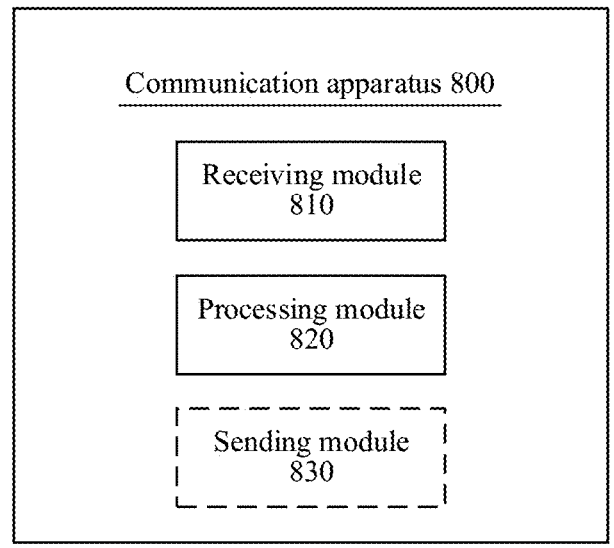
FIG. 8 is an example diagram of a communication apparatus 800 according to an embodiment of this application.

FIG. 8 is an example diagram of a communication apparatus 800 according to an embodiment of this application. The communication apparatus 800 is used in the first host. As shown in FIG. 8, the apparatus 800 includes a receiving module 810 and a processing module 820.

The receiving module 810 is configured to receive a memory access address sent by a network device. The memory access address points to a memory unit in a first memory pool, the network device is connected to the first host, the network device is configured to switch and forward a service of the first host, and the network device is further configured to manage the first memory pool.

The processing module 820 is configured to access the memory unit based on the memory access address when memory of the first host satisfies a preset condition.

Optionally, the network device may be further connected to at least one second host. The network device is configured to switch and forward a service of the at least one second host. The at least one second host provides a second memory pool. The first memory pool includes the second memory pool.

Optionally, the network device may include a third memory pool, and the first memory pool may include the third memory pool.

Optionally, the communication apparatus 800 may further include a sending module 830. The sending module 830 may be configured to send a request message to the network device when the memory of the first host satisfies the preset condition. The request message is for requesting memory in the first memory pool. The sending module may be implemented, for example using communication circuitry known in the art, such as a data transmitter.

Optionally, the preset condition may be any one of the following: memory usage of the first host is greater than a first threshold; remaining memory space of the first host is less than a second threshold; remaining memory space of the first host is less than memory space required for processing a service in a future target time period by the first host; or a memory usage policy of the first host is preferentially using the first memory pool.

Optionally, the first host may include a network interface card, and the first host may communicate with the network device via a remote direct memory access RDMA protocol.

Optionally, the first host may include a bus interface, and the first host may communicate with the network device via a peripheral component interconnect express PCIe bus or a compute express link CXL.

Optionally, when the first host no longer needs to use the memory unit, the sending module 830 may be further configured to send a notification message to the network device, where the notification message includes the memory access address, to enable the network device to release the memory unit.

Figure 9:
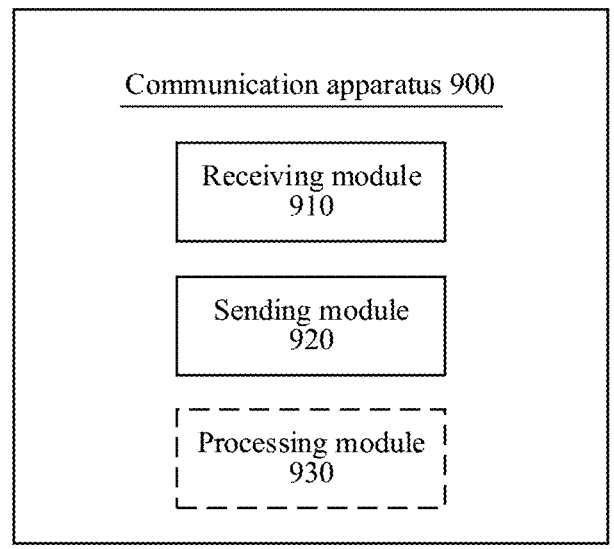
FIG. 9 is an example diagram of a communication apparatus 900 according to an embodiment of this application.

FIG. 9 is an example diagram of a communication apparatus 900 according to an embodiment of this application. The communication apparatus 900 is used in the network device. As shown in FIG. 9, the communication apparatus 900 includes a receiving module 910 and a sending module 920.

The receiving module 910 is configured to receive a request message sent by a first host. The request message is for requesting memory in a first memory pool, the network device is connected to the first host, the network device is configured to switch and forward a service of the first host, and the network device is further configured to manage the first memory pool.

The sending module 920 is configured to send a memory access address to the first host, where the memory access address points to a memory unit in the first memory pool.

Optionally, the network device may be further connected to at least one second host. The network device is configured to switch and forward a service of the at least one second host. The at least one second host provides a second memory pool. The first memory pool includes the second memory pool.

Optionally, the network device may include a third memory pool, and the first memory pool may include the third memory pool.

Optionally, the first host may communicate with the network device via a remote direct memory access RDMA protocol.

Optionally, the first host may communicate with the network device via a peripheral component interconnect express PCIe bus or a compute express link CXL.

Optionally, the communication apparatus 900 may further include a processing module 930. The processing module 930 may be configured to determine an idle memory unit in the first memory pool. The sending module 920 is further configured to send a memory access address corresponding to the idle memory unit to the first host, to enable the first host to use the idle memory unit.

It should be understood that the processing module 930 may be alternatively denoted as a memory management module, and this is not limited.

Optionally, the processing module 930 may be further configured to record a status of each memory unit in the first memory pool. The status includes idle and used.

Optionally, the receiving module 910 may be further configured to receive a notification message sent by the first host, where the notification message includes the memory access address. The processing module 930 may be further configured to release, based on the notification message, the memory unit corresponding to the memory access address.

Figure 10:
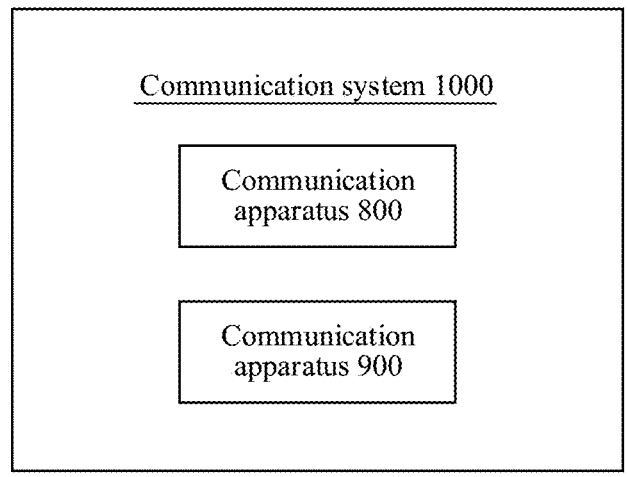
FIG. 10 is an example diagram of a communication system woo according to an embodiment of this application.
Figure 11:
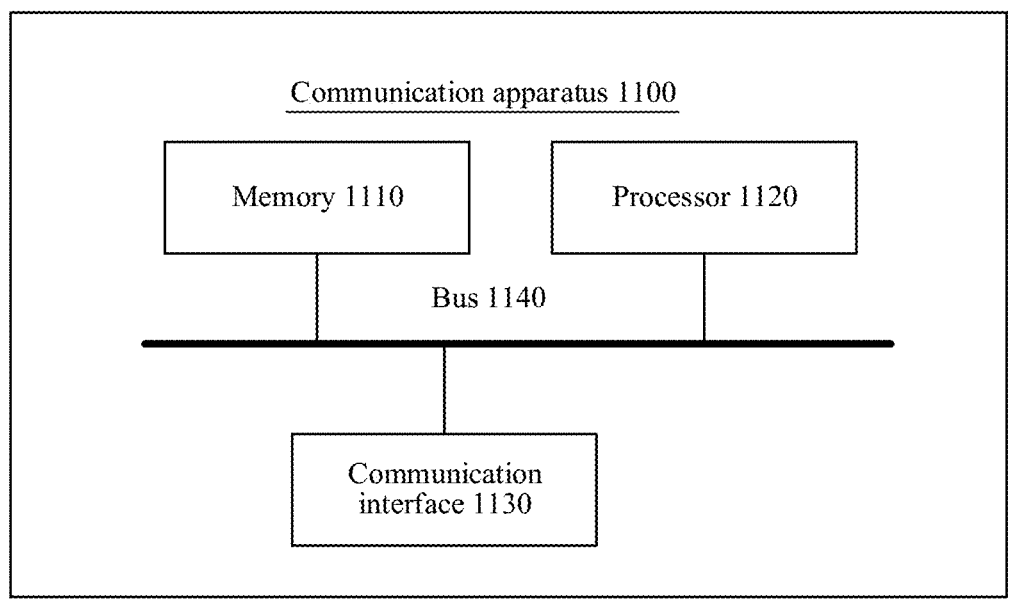
FIG. 11 is an example block diagram of a hardware structure of a communication apparatus 1100 according to an embodiment of this application.

FIG. 10 is an example diagram of a communication system moo according to an embodiment of this application. As shown in FIG. 10, the communication system woo includes a communication apparatus 800 and a communication apparatus 900.

FIG. 1100 is an example block diagram of a hardware structure of a communication apparatus 1100 according to an embodiment of this application. Optionally, the communication apparatus 1100 may be specifically a computer device. The communication apparatus 1100 includes a memory 1110, a processor 1120, a communication interface 1130, and a bus 1140. The memory 1110, the processor 1120, and the communication interface 1130 implement mutual communication connections via the bus 1140.

The memory 1110 may be a read-only memory (ROM), a static storage device, a dynamic storage device, or a random access memory (RAM). The memory 1110 may store a program. When the program stored in the memory 1110 is executed by the processor 1120, the processor 1120 is configured to perform the steps of the communication method in embodiments of this application.

The processor 1120 may be a general-purpose CPU, a microprocessor, an ASIC, a graphics processing unit (GPU), or one or more integrated circuits, and is configured to execute a related program, to implement the communication method in the method embodiments of this application.

Alternatively, the processor 1120 may be an integrated circuit chip, and has a signal processing capability. In an implementation process, the communication method in this application may be implemented through an integrated logic circuit of hardware in the processor 1120 or instructions in a form of software.

The processor 1120 may alternatively be a general-purpose processor, a digital signal processor (DSP), an ASIC, an FPGA or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished through a hardware decoding processor, or may be executed and accomplished through a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory mo. The processor 1120 reads information in the memory 1110, and completes, in combination with hardware of the processor 1120, functions that need to be performed by modules included in the apparatus in embodiments of this application, or performs the communication method in the method embodiments of this application.

The communication interface 1130 uses a transceiver apparatus, for example, but not limited to, a transceiver, to implement communication between the apparatus 1100 and another device or a communication network.

The bus 1140 may include a path for transmitting information between components (for example, the memory 1110, the processor 1120, and the communication interface 1130) of the apparatus 1100.

An embodiment of this application further provides a computing device, including at least one processor and a memory. The at least one processor is coupled to the memory, and is configured to read and execute instructions in the memory, to perform the communication method in the method embodiments of this application.

An embodiment of this application further provides a computer program product including instructions. When the computer program product is run on a computer, the computer is enabled to perform the communication method in the method embodiments of this application.

An embodiment of this application further provides a computer readable storage medium, including instructions. The instructions are used for implementing the communication method in the method embodiments of this application.

An embodiment of this application further provides a chip. The chip includes a processor and a data interface. The processor reads, through the data interface, instructions stored in a memory, to perform the communication method in the method embodiments of this application.

Optionally, in an implementation, the chip may further include a memory. The memory stores instructions. The processor is configured to execute the instructions stored in the memory. When the instructions are executed, the processor is configured to perform the communication method in the method embodiment of this application.

A person of ordinary skill in the art may recognize that in combination with the examples described in embodiments disclosed in this specification, units and algorithm steps may be implemented by electronic hardware or a combination of computer software and electronic hardware. Whether the functions are performed by hardware or software depends on particular applications and design constraints of technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented via some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

Embodiments of the present invention are summarized here. Other embodiments can also be understood from the entirety of the specification and the claims filed herein.

Example 1. A communication method, including: receiving, by a first host, a memory access address sent by a network device, where the memory access address points to a memory unit in a first memory pool, the network device is connected to the first host, the network device is configured to switch and forward a service of the first host, and the network device is further configured to manage the first memory pool; and when memory of the first host satisfies a preset condition, accessing, by the first host, the memory unit based on the memory access address.

Example 2. The communication method according to example 1, where the network device is further connected to at least one second host, the network device is configured to switch and forward a service of the at least one second host, the at least one second host provides a second memory pool, and the first memory pool comprises the second memory pool.

Example 3. The communication method according to example 1 or 2, where the network device comprises a third memory pool, and the first memory pool comprises the third memory pool.

Example 4. The communication method according to any one of examples 1 to 3, where before the receiving, by a first host, a memory access address sent by a network device, the method further comprises: when the memory of the first host satisfies the preset condition, sending, by the first host, a request message to the network device, where the request message is for requesting memory in the first memory pool.

Example 5. The communication method according to any one of examples 1 to 4, where the preset condition is any one of the following: memory usage of the first host is greater than a first threshold; remaining memory space of the first host is less than a second threshold;

remaining memory space of the first host is less than memory space required for processing a service in a future target time period by the first host; or a memory usage policy of the first host is preferentially using the first memory pool.

Example 6. The communication method according to any one of examples 1 to 5, where the first host comprises a network interface card, and the first host communicates with the network device via a remote direct memory access RDMA protocol.

Example 7. The communication method according to any one of examples 1 to 5, where the first host comprises a bus interface, and the first host communicates with the network device via a peripheral component interconnect express PCIe bus or a compute express link CXL.

Example 8. The communication method according to any one of examples 1 to 7, where when the first host no longer needs to use the memory unit, the method further comprises: sending, by the first host, a notification message to the network device, where the notification message comprises the memory access address, to enable the network device to release the memory unit.

Example 9. A communication method, including: receiving, by a network device, a request message sent by a first host, where the request message is for requesting memory in a first memory pool, the network device is connected to the first host, the network device is configured to switch and forward a service of the first host, and the network device is further configured to manage the first memory pool; and sending, by the network device, a memory access address to the first host, where the memory access address points to a memory unit in the first memory pool.

Example 10. The communication method according to example 9, where the network device is further connected to at least one second host, the network device is configured to switch and forward a service of the at least one second host, the at least one second host provides a second memory pool, and the first memory pool comprises the second memory pool.

Example 11. The communication method according to example 9 or 10, where the network device comprises a third memory pool, and the first memory pool comprises the third memory pool.

Example 12. The communication method according to any one of examples 9 to 11, where the first host communicates with the network device via a remote direct memory access RDMA protocol.

Example 13. The communication method according to any one of examples 9 to 11, where the first host communicates with the network device via a peripheral component interconnect express PCIe bus or a compute express link CXL.

Example 14. The communication method according to any one of examples 9 to 13, where the sending, by the network device, a memory access address to the first host comprises: determining, by the network device, an idle memory unit in the first memory pool; and sending, by the network device, a memory access address corresponding to the idle memory unit to the first host, to enable the first host to use the idle memory unit.

Example 15. The communication method according to example 14, where the method further comprises: recording, by the network device, a status of each memory unit in the first memory pool, where the status comprises idle and used.

Example 16. The communication method according to example 14, where the method further comprises: receiving, by the network device, a notification message sent by the first host, where the notification message comprises the memory access address; and releasing, by the network device based on the notification message, the memory unit corresponding to the memory access address.

Example 17. A communication apparatus, where the communication apparatus is used in a first host, and the communication apparatus comprises: a receiving module, configured to receive a memory access address sent by a network device, where the memory access address points to a memory unit in a first memory pool, the network device is connected to the first host, the network device is configured to switch and forward a service of the first host, and the network device is further configured to manage the first memory pool; and a processing module, configured to access the memory unit based on the memory access address when memory of the first host satisfies a preset condition.

Example 18. The communication apparatus according to example 17, where the network device is further connected to at least one second host, the network device is configured to switch and forward a service of the at least one second host, the at least one second host provides a second memory pool, and the first memory pool comprises the second memory pool.

Example 19. The communication apparatus according to example 17 or 18, where the network device comprises a third memory pool, and the first memory pool comprises the third memory pool.

Example 20. The communication apparatus according to any one of examples 17 to 19, where the communication apparatus further comprises: a sending module, configured to send a request message to the network device when the memory of the first host satisfies the preset condition, where the request message is for requesting memory in the first memory pool.

Example 21. The communication apparatus according to any one of examples 17 to 20, where the preset condition is any one of the following: memory usage of the first host is greater than a first threshold; remaining memory space of the first host is less than a second threshold; remaining memory space of the first host is less than memory space required for processing a service in a future target time period by the first host; or a memory usage policy of the first host is preferentially using the first memory pool.

Example 22. The communication apparatus according to any one of examples 17 to 21, where the first host comprises a network interface card, and the first host communicates with the network device via a remote direct memory access RDMA protocol.

Example 23. The communication apparatus according to any one of examples 17 to 21, where the first host comprises a bus interface, and the first host communicates with the network device via a peripheral component interconnect express PCIe bus or a compute express link CXL.

Example 24. The communication apparatus according to example 20, where when the first host no longer needs to use the memory unit, the sending module is further configured to: send a notification message to the network device, where the notification message comprises the memory access address, to enable the network device to release the memory unit.

Example 25. A communication apparatus, where the communication apparatus is used in a network device, and the communication apparatus comprises: a receiving module, configured to receive a request message sent by a first host, where the request message is for requesting memory in a first memory pool, the network device is connected to the first host, the network device is configured to switch and forward a service of the first host, and the network device is further configured to manage the first memory pool; and a sending module, configured to send a memory access address to the first host, where the memory access address points to a memory unit in the first memory pool.

Example 26. The communication apparatus according to example 25, where the network device is further connected to at least one second host, the network device is configured to switch and forward a service of the at least one second host, the at least one second host provides a second memory pool, and the first memory pool comprises the second memory pool.

Example 27. The communication apparatus according to example 25 or 26, where the network device comprises a third memory pool, and the first memory pool comprises the third memory pool.

Example 28. The communication apparatus according to any one of examples 25 to 27, where the first host communicates with the network device via a remote direct memory access RDMA protocol.

Example 29. The communication apparatus according to any one of examples 25 to 27, where the first host communicates with the network device via a peripheral component interconnect express PCIe bus or a compute express link CXL.

Example 30. The communication apparatus according to any one of examples 25 to 29, where the communication apparatus further comprises: a processing module, configured to determine an idle memory unit in the first memory pool; and the sending module is further configured to send a memory access address corresponding to the idle memory unit to the first host, to enable the first host to use the idle memory unit.

Example 31. The communication apparatus according to example 30, where the processing module is further configured to: record a status of each memory unit in the first memory pool, where the status comprises idle and used.

Example 32. The communication apparatus according to example 30, where the receiving module is further configured to: receive a notification message sent by the first host, where the notification message comprises the memory access address; and the processing module is further configured to release, based on the notification message, the memory unit corresponding to the memory access address.

Example 33. A communication system, including the communication apparatus according to any one of examples 17 to 24 and the communication apparatus according to any one of examples 25 to 32.

Example 34. A communication apparatus, including a processor and a memory, where the processor runs instructions in the memory, to enable the communication apparatus to perform the communication method according to any one of examples 1 to 8, and/or perform the communication method according to any one of examples 9 to 16.

Example 35. A computer-readable storage medium, including instructions, where the instructions are used for implementing the communication method according to any one of examples 1 to 8, and/or implementing the communication method according to any one of examples 9 to 16.

The foregoing descriptions are merely specific implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   satisfying, by a memory of a first host, a preset condition;
   in response to the memory of the first host satisfying the preset condition, sending, by the first host, a request message to a network device, wherein the request message is configured to request memory in a first memory pool;
   receiving, by the first host, a memory access address sent by the network device, wherein the memory access address points to a memory unit in the first memory pool, the network device is connected to the first host, the network device is configured to switch and forward a service of the first host, and the network device is further configured to manage the first memory pool;
   accessing, by the first host, the memory unit based on the memory access address;
   no longer needing, by the first host, to use the memory unit; and
   in response to no longer needing, by the first host, to use the memory unit, sending, by the first host, a notification message to the network device, wherein the notification message comprises the memory access address to enable the network device to release the memory unit.

2. The communication method according to claim 1, wherein the network device is further connected to at least one second host, the network device is configured to switch and forward a service of the at least one second host, the at least one second host provides a second memory pool, and the first memory pool comprises the second memory pool.

3. The communication method according to claim 1, wherein the network device comprises a third memory pool, and the first memory pool comprises the third memory pool.

4. The communication method according to claim 1, wherein the preset condition is any one of the following:
   a memory usage of the first host is greater than a first threshold;
   a remaining memory space of the first host is less than a second threshold;
   the remaining memory space of the first host is less than a memory space required for processing a service in a future target time period by the first host; or
   a memory usage policy of the first host comprises preferentially using the first memory pool.

5. The communication method according to claim 1, wherein the first host comprises a network interface card, and the method further comprises the first host communicating with the network device via a remote direct memory access RDMA protocol.

6. The communication method according to claim 1, wherein the first host comprises a bus interface, and the method further comprises the first host communicating with the network device via a peripheral component interconnect express PCIe bus or a compute express link CXL.

7. A communication method, comprising:
receiving, by a network device, a request message sent by a first host based on a memory of the first host satisfying a first condition, wherein the request message comprises a request for memory in a first memory pool, the network device is connected to the first host, the network device is configured to switch and forward a service of the first host, and the network device is further configured to manage the first memory pool;
sending, by the network device, a memory access address to the first host in response to the request message, wherein the memory access address points to a memory unit in the first memory pool;
providing, by the network device, access to the first memory pool to the first host;
receiving, by the network device, a notification message sent by the first host based on the first host not needing the memory unit, wherein the notification message comprises the memory access address; and
releasing, by the network device based on the notification message, the memory unit corresponding to the memory access address.

8. The communication method according to claim 7, wherein the network device is further connected to at least one second host, and the method further comprises the network device switching and forwarding a service of the at least one second host, wherein the at least one second host provides a second memory pool, and the first memory pool comprises the second memory pool.

9. The communication method according to claim 7, wherein the network device comprises a third memory pool, and the first memory pool comprises the third memory pool.

10. The communication method according to claim 7, wherein the first host communicates with the network device via a remote direct memory access RDMA protocol.

11. The communication method according to claim 7, wherein the first host communicates with the network device via a peripheral component interconnect express PCIe bus or a compute express link CXL.

12. The communication method according to claim 7, wherein the sending, by the network device, the memory access address to the first host comprises:
determining, by the network device, an idle memory unit in the first memory pool; and
sending, by the network device, a memory access address corresponding to the idle memory unit to the first host to enable the first host to use the idle memory unit.

13. The communication method according to claim 12, wherein the method further comprises:
recording, by the network device, a status of each memory unit in the first memory pool, wherein the status comprises idle and used.

14. A communication apparatus configured to be used in a first host, the communication apparatus comprising:
a communication circuit configured to:
send a request message to a network device in response to a memory of the first host satisfying a preset condition, wherein the request message is configured to request memory in a first memory pool,
receive a memory access address sent by the network device in response to the request message, wherein the memory access address points to a memory unit in the first memory pool, the network device is configured to be connected to the first host, the network device is configured to switch and forward a service of the first host, and manage the first memory pool,
in response to the first host no longer needing to use the memory unit, send a notification message to the network device, wherein the notification message comprises the memory access address to enable the network device to release the memory unit; and
a processor configured to access the memory unit based on the memory access address when the memory of the first host satisfies the preset condition.

15. The communication apparatus according to claim 14, wherein the network device is further configured to be connected to at least one second host, the network device is configured to switch and forward a service of the at least one second host, the at least one second host is configured to provide a second memory pool, and the first memory pool comprises the second memory pool.

16. The communication apparatus according to claim 14, wherein the network device comprises a third memory pool, and the first memory pool comprises the third memory pool.

17. The communication apparatus according to claim 14, wherein the preset condition is any one of the following:
a memory usage of the first host is greater than a first threshold;
a remaining memory space of the first host is less than a second threshold;
the remaining memory space of the first host is less than a memory space required for processing a service in a future target time period by the first host; or
a memory usage policy of the first host comprises preferentially using the first memory pool.

18. The communication apparatus according to claim 14, wherein the first host comprises a network interface card, and the communication circuit is further configured to communicate with the network device via a remote direct memory access RDMA protocol.

19. The communication apparatus according to claim 14, wherein the first host comprises a bus interface, and the communication circuit is further configured to communicate with the network device via a peripheral component interconnect express PCIe bus or a compute express link CXL.

20. The communication apparatus according to claim 14, wherein the memory access address corresponds to an idle memory unit in the first memory pool.

* * * * *